Nov. 30, 1965 J. S. JACKSON ETAL 3,221,285

CIRCUIT MOUNTING ASSEMBLY

Filed Feb. 25, 1960 4 Sheets-Sheet 1

INVENTORS
JAMES S. JACKSON
WILLIAM J. BARTIK

AGENT

*INVENTORS*
JAMES S. JACKSON
WILLIAM J. BARTIK

Charles G. English
*AGENT*

*INVENTORS*
JAMES S. JACKSON
WILLIAM J. BARTIK

Charles G. English
AGENT

CIRCUIT MOUNTING ASSEMBLY

Filed Feb. 25, 1960 4 Sheets-Sheet 4

*INVENTORS*
JAMES S. JACKSON
WILLIAM J. BARTIK

Charles E. Englisch
AGENT 3,221,285

CIRCUIT MOUNTING ASSEMBLY

James S. Jackson, Media, and William J. Bartik, Hatboro, Pa., assignors to Sperry Rand Corporation, New York, N.Y., a corporation of Delaware Filed Feb. 25, 1960, Ser. No. 10,983
13 Claims. (Cl. 339—17)

This invention relates to an assembly for supporting electrical circuits with a large number of terminals, such as a magnetic core matrix; and more particularly, to such a supporting assembly which includes connector terminals for effecting external interconnections with other assemblies of similar design such that soldered interconnections are avoided.

In a type of construction of a magnetic core matrix memory unit used in the past, each magnetic core matrix array or core plane was interconnected to each other core plane by means of a plurality of conductors which were soldered to the external terminals of each of the boards on which the arrays were mounted. Thus, for example, if a plurality of boards each having a 50 by 50 matrix array thereon were to be interconnected to form a memory unit which comprised, for example, 60 arrays or planes, it was necessary to make about 12,000 solder connections. That is, a 50 by 50 array would have 50 X-axis conductors, each of which was connected between two associated terminals on opposite sides of the core plane board, which terminals were used for external interconnections; likewise, there would be 50 Y-axis conductors, each of which was connected between two associated terminals which were to be used for external interconnections. These terminals would normally be arrayed around the periphery of the board (or frame) upon which the matrix was mounted, such that the associated end terminals for each row or column of the X or Y-axis conductors, respectively, were aligned on opposite sides of the board. Therefore, there was a total of at least 200 terminals per board for the illustrative matrix. The terminals on each board were then connected by short conductors to associated terminals on an adjacent board. Since each terminal was soldered to the short conductor which connected the arrays on the adjacent boards, there were of course, at least 200 solder connections per board. Of course, larger matrices required more terminals, and smaller matrices required fewer terminals, and the number of solder connections varied accordingly. Additional connections for other conductors, such as output windings, are also needed. The number of additional conductors and, therefore, the number of additional connections is variable and is dependent upon the mode of operation desired.

The problem of multitudinous solder connections is, of course, burdensome in the initial construction of a memory unit, but it becomes doubly cumbersome in the event that a minor correction is required after the memory is constructed. That is, if, for example, a single core is damaged or a single core plane is otherwise defective, thereby necessitating the removal of that core plane, generally all of the solder joints on the plane or planes involved must be first opened. These joints are then reclosed when a new or repaired board is replaced. Frequent replacement requirements will, of course, result in an extensive "down time" for the apparatus, and if, for example, the memory unit is associated with a digital computer or the like this down time and replacement problem may prove to be extremely expensive and result in a loss of usefulness for the machine.

In accordance with the present invention, an assembly for supporting electrical circuits includes a frame having spring contact terminals projecting along its edges and an arrangement for stacking the frames so that contacts are made between corresponding terminals.

A magnetic-core matrix assembly in accordance with the invention includes a frame for supporting at least one magnetic core matrix and a plurality of connector terminals with contacts for external interconnection directly between the associated terminals of different core plane supporting frames in a magnetic core memory unit. The contacts of the external connector terminals are shaped so that the terminals which are associated in a predetermined manner are actually in direct contact thereby eliminating the large number of external solder connections between the several boards in the memory unit.

In one embodiment, the supporting board is arranged to have two core plane arrays on each board in such a fashion that there are only two external terminals for each row or column on the board or, in effect, only one external terminal per row (or column) per core plane. Thus, the number of external connections per board are reduced by one-half.

A primary object of the invention is to provide a means for supporting an array of magnetic cores and interconnecting a plurality of these arrays.

An important object of the invention is to reduce the number of external connections which are made between several magnetic core planes.

Another object of the invention is to reduce the number of solder connections which are made between several magnetic core planes.

A further object of the invention is to provide a core plane supporting board which is capable of accomodating two core planes whereby the number of connections between boards may be reduced.

Still another object of the invention is to provide a novel circuit frame and external terminal construction whereby external solder connections between a plurality of the frames may be avoided.

A still further object of the invention is to provide a circuit board with novel terminals which permit a special wiring of a magnetic core array whereby the terminals and, therefore, the cores may be placed at closer centers to give a larger packing density of cores per unit area of a supporting board.

Yet another object of the invention is to provide a means for assuring a simple yet reliable interconnection between core planes.

Specifically, the invention is designed to provide a novel assembly comprising a supporting circuit frame with terminals thereon, which assembly is readily adaptable to rapid and relatively inexpensive manufacture by mass production methods. Moreover, a plurality of these circuit frames may be stacked together to provide a unit which is similarly adaptable to mass production methods.

Further objects and advantages may be noted in the following description which is to be read in conjunction with the accompanying drawings in which.

Throughout the several figures, similar elements are designated by similar reference numerals.

Figure 1:
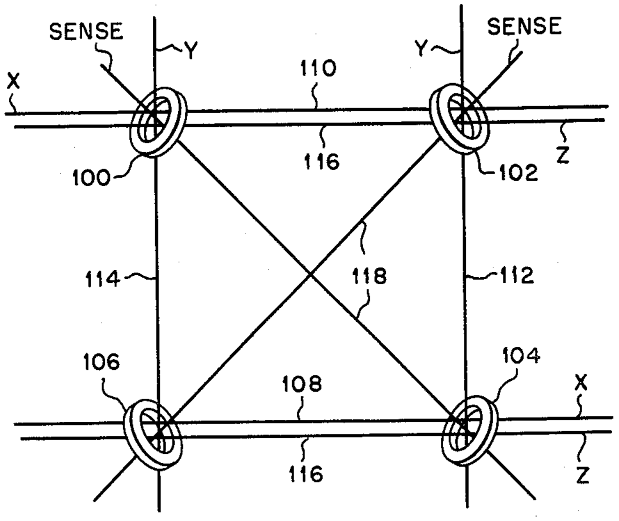
FIGURE 1 is a plan view of a small portion of a magnetic core plane with a typical winding pattern through four cores of the core plane.

Referring now to FIGURE 1, there is illustrated a 2 by 2 portion of a magnetic core matrix array or plane of a type that is known in the art. A brief description of the wiring and operation of this core plane is presented as background for this invention.

The portion of a memory plane includes magnetic cores 100, 102, 104 and 106 which comprises 2 cores in each planar dimension. These magnetic cores are of any well known type and they may be composed, for example, of a ferrite and have the toroidal configuration as shown. In addition, each of the cores 100–104 may be fabricated such that they exhibit certain hysteresis characteristics. For example, they may exhibit a substantially rectangular hysteresis characteristic, whereby the application of a certain predetermined magnetic field to the core will cause it to shift from one magnetic remanent state to another. This magnetic field is normally applied by means of conductors passing through the cores. Thus, each core is linked by an X-axis conductor, 108 or 110. In addition, each core is linked by a Y-axis conductor 112 or 114. These X and Y-axis conductors may comprise one turn or multiple turn windings and are, as is the usual case in magnetic core matrices, the core selection conductors to which the magnetizing current for switching the cores is supplied. In coincident-current switching commonly used in the art, the switching is achieved by applying a portion, for example approximately one-half, of the required coercive-force current to each of the X and Y windings of the core to be selected. If such half-magnitude currents are applied only to conductors 110 and 114, core 100 receives a sufficiently large magnetizing force to switch. The other cores 102, 104, and 106 do not switch. In the operation known as "reading," the cores are driven in a certain direction that may be considered to be negative.

In addition to the X and Y selection conductors, each core in the plane is commonly linked by another conductor 116, sometimes called the Z conductor. This conductor 116 may be termed the inhibit conductor (or winding) and is shown threaded parallel to the X axis. The inhibit winding 116 is also energized by the approximately one-half magnitude current as in the X and Y conductors. However, the Z winding has a sense of linkage such that it creates a magnetizing force which is opposed to that created by the X and Y conductors during the operation known as writing. Thus, if during writing X and Y conductors 110 and 114 are energized together in a positive direction, the core 100 at the intersection thereof would ordinarily be switched in a positive direction. However, if the inhibit (or Z axis) winding 116 is energized at the same time (in the negative direction), the core 110 at the intersection will remain switched in the negative direction because the effective magnetizing force produced will be equivalent to that produced by only a half-magnitude current.

Still another conductor 118 usually links each of the cores in a plane as shown in FIGURE 1. This conductor 118 may be termed the sense conductor (or S winding) and is used for reading out the information which is stored in a matrix array by the magnetic states of the several cores. The above described wiring scheme for a magnetic core plane for storage of information, and the construction and operation thereof are known in the art, especially in the field of digital computing devices.

Figure 2:
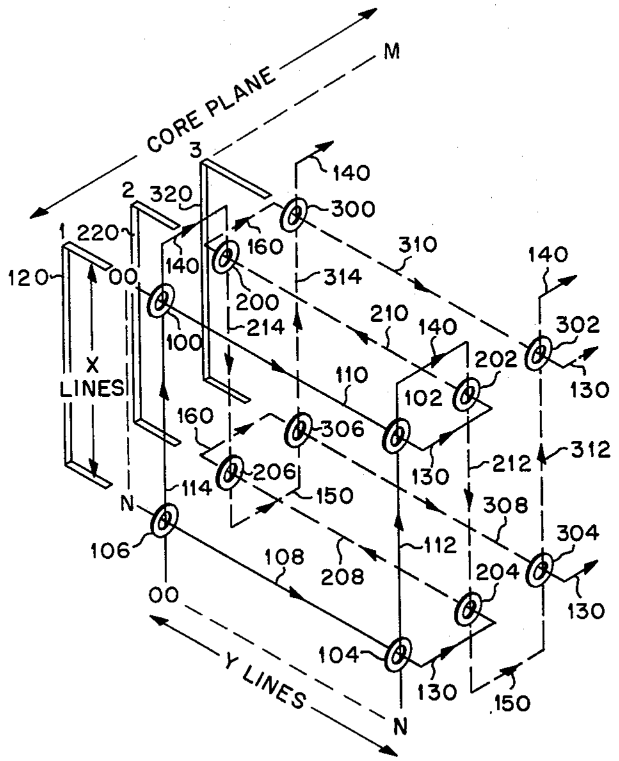
FIGURE 2 is a schematic wiring diagram for wiring from core plane to core plane.

FIGURE 2 is a schematic inter-plane wiring diagram for a magnetic core memory unit or stack utilizing a plurality of M core planes, each of which is similar to the one which is described in connection with FIGURE 1. Thus, the first core plane designated by numeral 120 will be assumed to comprise cores 100, 102, 104 and 106 representing a memory matrix of N rows and N columns. The N X-axis conductors are represented by conductors 108 and 110; and N Y-axis conductors are represented by conductors 112 and 114. For simplicity, the Z and S conductors have been omitted but it will be understood that they are present and located in each plane as previously described. The Z and S conductors are individual to each plane, and, therefore, they do not form a part of the inter-plane wiring. The Z conductor receives the inputs signals for its plane, and the S conductor supplies the output signals. Corresponding parts of the second plane 220 and of the third plane 320 are designated by the same last two numerals as those in the first plane, with the first numeral for the second plane numerals being a 2 and for the third plane numerals being a 3.

Corresponding conductors of the different planes 120, 220 and 320 are interconnected. Thus, the first X-axis conductor 110 of the first plane 120 is connected via connection 130 to one end of the first X-axis conductor 210 of the second plane 220. The other end of the latter named conductor is, in turn, connected via connection 160 to one end of the first X-axis conductor 310 of the third plane 320, and so on. Thus, all of the first X-axis conductors of the several core planes can be simultaneously energized. The other X-axis conductors 108, 208, 308 are similarly interconnected and simultaneously energized. The corresponding Y-axis conductors of the different planes are similiarly interconnected via connections 140 and 150 in order that they may be energized at the same time.

Figure 3:
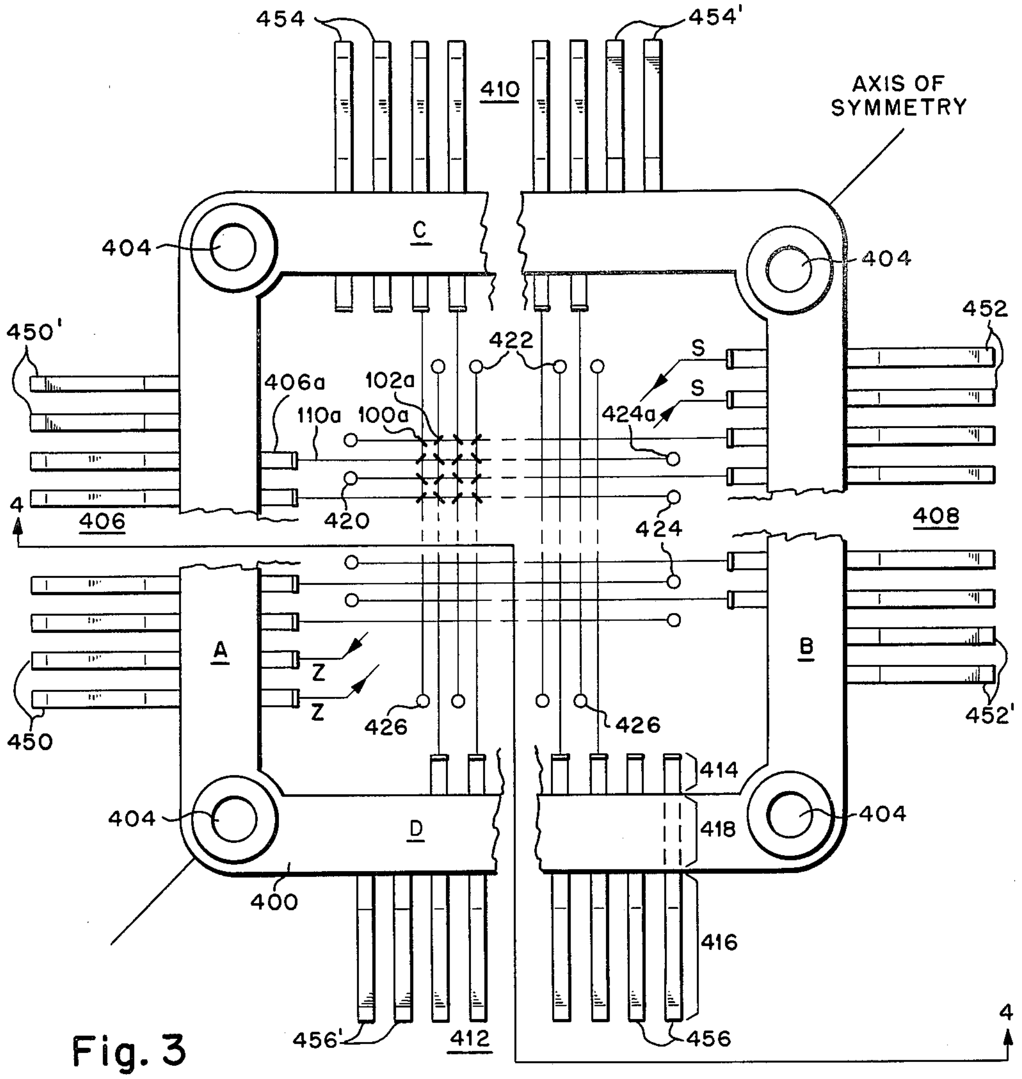
FIGURE 3 is a plan view of portions of a magnetic core plane assembly as provided by this invention.
Figure 4:
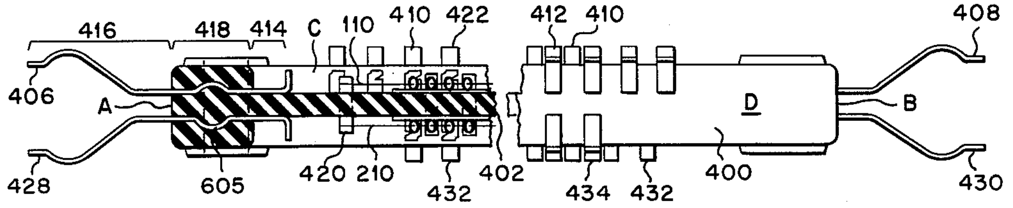
FIGURE 4 is a partially sectioned side view taken along the line 4—4 of FIGURE 3.

Now turning to FIGURES 3 and 4, there are shown two views of a core-plane assembly embodying the present invention. These figures, in which similar elements again are designated by similar reference numerals, are discussed together for purposes of clarity of description. The assembly includes a frame 400 which is substantially square in configuration. The frame comprises four sides A, B, C and D; and an integral central plane 402. By referring to FIGURE 4, it may be seen that the central plane 402 is actually a recessed portion of the frame with its upper and lower surfaces recessed within the top and bottom faces of the sides A, B, C and D. The depth of the recess of the central plane 402 should be such that the core planes mounted therein (as described subsequently) do not project beyond the faces of the sides. The entire frame 400 is made of an insulating material, for example, Black Phenolic. Holes 404 are provided in the corners of the frame 400.

Various components or elements may be imbedded or encased in the sides A, B, C and D of the frame 400 and/or in the plane 402. For example, FIGURE 3 shows a plurality of contact terminals mounted along each side of the frame 400. That is, a plurality of terminals 406 (all of which terminals are similar in configuration) are mounted in side A of the frame. Similarly, the sides B, C and D of the frame 400 each have mounted thereon another plurality of terminals designated as terminals 408, 410 and 412, respectively. These terminals, by which interconnection is made between the various core planes, may be fabricated of an electrically conducting material, for example a beryllium copper alloy. The Be-Cu alloy is suggested because of its superior electrical conducting characteristics as well as its resilience which makes it useful as a spring contact. The terminals 406, 408, 410 and 412 are composed of three principal portions: the interior portion 414, the exterior portion 416 and the holding or mounting portion 418.

In addition, a plurality of feedthrough lugs 420 are mounted in the central plane 402 adjacent side A and in the spaces between terminals 406. Similarly, feedthrough lugs 422, 424 and 426 are mounted in plane 402 adjacent sides B, C and D respectively. These lugs are located in the spaces between the terminals 408, 410 and 412, respectively. These lugs are fabricated of any suitable electrical conducting material, for example, the beryllium copper alloy previously mentioned. Furthermore, the lugs 420–426, are mounted in the plane 402 such that a portion of each lug projects slightly from the plane. These slight projections of the lugs 420–426 are soldered to electrical conductors, for example, the X-axis conductor 108 or 110 as shown in FIGURE 1.

As is shown in FIGURE 3, the terminals mounted on opposite sides of each core plane are mounted in an offset relation. Thus, it will be seen that the terminals 406 on one side of the frame, for example side A, are aligned with the spaces between the terminals 408 on the opposite side B, of the frame. Therefore, the terminals 406 are aligned with the lugs 424 on the opposite side of the frame since the lugs are located in the spaces between the terminals mounted on said opposite side. Thus, the first row X-axis conductor 110*a* (shown at the top of FIGURE 3) is soldered or otherwise connected to its terminal 406*a*, linked through each of the cores 100*a* and 102*a* in the first row, and connected to the lug 424*a* which is aligned with the terminal 406*a*. Similarly, each of the terminals 408 is connected via a conductor such as conductor 110 (upper plane of FIGURE 4) to its associated feedthrough lug 420 and, thereby, to conductor 210 in the lower plane connected to the corresponding contact 430. The other pairs of contacts 410, 432 and 412, 434 are similarly connected to their respective feedthrough lugs 426 and 422.

It will be further noted that only alternate rows and/or columns are connected to terminals or lugs on the same side of the frame 400. For example, the X–axis rows in the odd-numbered positions starting from the top have their conductors connected to terminals 406 on side A, whereas X–axis rows in the even-numbered positions have the conductors connected to terminals 408 on side B of frame 400. Similarly, the Y–axis rows and/or columns are alternately aligned along opposite sides C and D of frame 400.

It will be seen in Figure 4 that each frame 400 contains two core planes respectively mounted on the upper and lower surfaces of the central plane 402. The terminals connected to the upper and lower core planes are in vertical alignment. For example, terminals 406, which are connected to the upper core plane (Figure 3), and terminals 428 (Figure 4), which are connected to the lower core plane, are mounted in side A with the terminals 406 directly above the terminals 428 in individual (one-to-one) relation. Similarly, terminals 408, 410 and 412 are vertically aligned with lower plane terminals 430, 432 and 434 respectively. These vertically aligned terminals 406 and 428 are also horizontally alinged with a similar feed-through lug 424. Thus, each upper terminal, for example 406a, is connected to an X–axis conductor which passes through each of the magnetic cores in a row in the upper core plane, as described previously, to the associated feedthrough lug 424a and connected thereto. Similarly, the lower terminal 428 (not shown) which is directly below upper terminal 406a is connected to another X–axis conductor which passes through each of the cores in a certain row in the lower core plane to the feedthrough lug 424a and is connected thereto. Therefore, since the feedthrough lug is electrically conductive, there is obtained a single electrical path from the upper terminal 406a to the lower terminal 428a, which single path interconnects two rows of cores on *two* separate core planes. Each pair of upper and lower contacts 406 and 428, 408 and 430, 410 and 432, 412 and 434 is similarly connected. This interconnection of core planes is shown schematically in FIGURE 2 in which interconnecting lines 130 (for the X-axis) and 140 (for the Y-axis) represent the feedthrough lugs 420 or 424 and 422 or 426 respectively.

Figure 5:
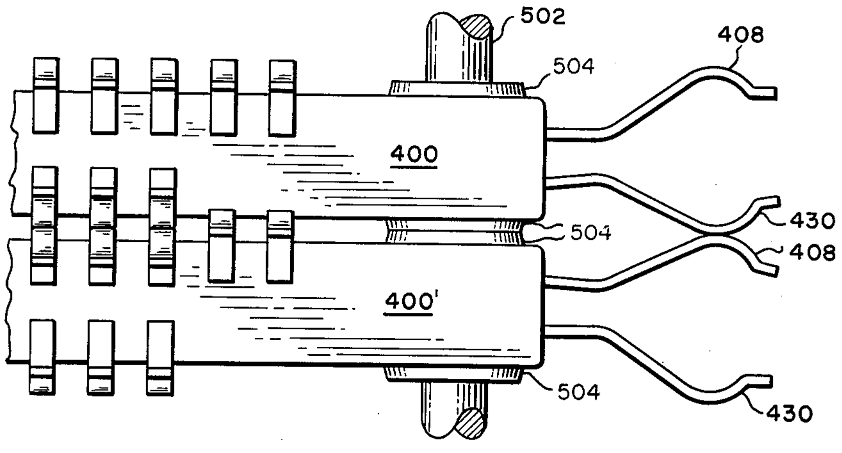
FIGURE 5 is a side view of portions of a plurality of mounted assemblies of this invention.

Turning now to FIGURE 5, portions of a plurality of the core plane assemblies of the instant invention are shown stacked, as they might be, in a magnetic-core memory unit. Two frames 400 and 400′ are mounted on a rod 502 which passes through one of the holes 404 shown in FIGURE 3. By means of this type of mounting, many advantages are permitted including a sure, accurate assembly alignment. For simplicity, only some of terminals on each frame 400 and 400′ are shown. The terminals 408 have an arcuate section of the exterior portion 416 which extends beyond the upper surface of the frame 400. This arcuate section also extends beyond a spacing collar 504 shown in FIGURE 5. Similarly, the terminals 430 have an arcuate section that extends beyond the collar 504 on the lower surface. Therefore, when a plurality of the frames 400 and 400' are mounted on a rack represented by the rod 502, the terminals 408 of the upper face of frame 400′ and the terminals 430 at the adjacent lower face of frame 400 are in alignment and make contact. Since the terminals are made of a resilient material, these contacting terminals 408 and 430 are held in spring contact by their mutual resilience. In addition, by closely spacing the core planes, this spring contacting cooperation will be assured by the compression forces between the associated terminals.

Reference is again made to FIGURE 2, in order to further describe the nature of the interconnection of the several (M) core planes by the arrangement of the terminals 408 and 430. The first and second planes 120, 220 (FIGURE 2) may be considered to be the two planes mounted on frame 400. The terminals 408 and 430 are connected to conductors like 110 and 210, respectively (in FIGURES 2 and 3), which link pluralities of cores in the two planes, and connect to a feedthrough lug 420 as shown in FIGURE 3 and as described supra. The interconnection of two planes in the same frame by feedthrough lugs 420–426 corresponds to the interconnection of two planes 120 and 220 represented by lines 130 and 140 for the rows and columns in FIGURE 2. The two terminals 408 and 430 in contact, shown in FIGURE 5 provide an effective connection between the conductors connected to these terminals, that is, between the conductors 210 of the lower plane in frame 400 and the conductors 110 in the upper plane of frame 400′. Referring to the schematic illustration of FIGURE 2, the external connection of contacts 408 and 430 corresponds to the connection of line 160 between conductors 210 and 310 in FIGURE 2. The corresponding interconnections between the column contacts 410, 432 and 412, 434 of different frames are represented by lines 150 in FIGURE 2. This type of external connection is continued between each adjacent pair of frames whereby there is effectively one conductor linking all of the cores of the planes in the same row or column. It may be seen, of course, that each of the rows or columns is connected, in a similar manner. With this core plane construction, a magnetic core memory unit may be assembled which may have any desirable number of core planes.

It will be evident that a signal applied to a terminal in an end plane for a particular row or column will be passed through the appropriate conductor for that row or column and through the entire memory unit of assembled frames. For example, if a signal is applied to terminal 406*a* (FIGURE 3) of the first row, this signal will be supplied to feedthrough lug 424*a* via conductor 110*a*; from the lug 424*a* to the corresponding contact terminal 428 via the first row conductor 210 in the lower plane; from the lower contact terminal 428 of the first frame to the upper first-row contact terminal 406; then to the associated feedthrough lug 424 via the proper conductor in the upper plane on the second frame; from that feedthrough lug 424 to the contact terminal 428 on the lower plane, and so on. Thus, a reliable connection is effected between a predetermined conductor (row or column) in each and every core plane in the memory unit, and these connections may be readily disconnected for the removal of one or more frames 400.

On each frame side there is a predetermined number of extra terminals 450, 452 on the upper surfaces of sides A and B, and terminals 545 and 456 on the lower surfaces of sides C and D, which are not associated with X and Y conductors 108–114. These terminals 450–456 are associated only with their own core plane, and are not to be connected to the contacts of other planes or frames. These extra terminals are not vertically aligned with any of the other terminals on the same side of the board. These terminals are to be used for making connections with other conductors, such as the Z and S conductors 116, 118 of FIGURE 1. FIGURE 3 shows two extra terminals 450–456 at each corner of the frame 400. The lower-left corner shows terminals 450 on side A connected to the Z-axis conductor (conductor 116 of FIGURE 1 previously described). Accordingly then, the terminals 450 act as the input terminals for the inhibit control, or Z, conductor. Similarly, in the upper-right corner the extra terminals 452 are connected to the ends of the sense conductor (conductor 118 of FIGURE 1) which links each core along a diagonal. The location and the number of the extra terminals is variable and is not fixed to the conditions indicated. For example, two terminals may be located in different corners and connected to the two ends of a conductor. The extra terminals may be any desired number according to the wiring scheme desired, but for the sake of clarity in the figures the number is limited to two on each side. In addition, additional control conductors may be added at substantially any time even after the complete fabrication of a core plane assembly proposed by this invention whereby the wiring scheme may be conveniently altered.

The aforementioned extra terminals 450–456 are located so as to give a symmetrical configuration when rotated about one diagonal so that the frame may be turned upside down (upper to lower and vice versa) and the sense terminals 452 and 454 would be interchanged. Thus, the frame may be used with either plane in the upper position after assembly. The symmetry may be arranged to be about any other centerline. Other extra terminals 450′–456′ provide complete rotational symmetry of the frame terminals prior to connection of the wires. These terminals 450′–456′ may be used for any other connections that may be needed. As is described below in relation to FIGURE 6, the terminals (406, etc.) may be inserted into the frame 400 in the form of a prepunched and pre-formed unitary strip of a plurality of these terminals. By utilizing this method, there is achieved an ease of manufacture provided by mass and uniform production methods.

Figure 6:
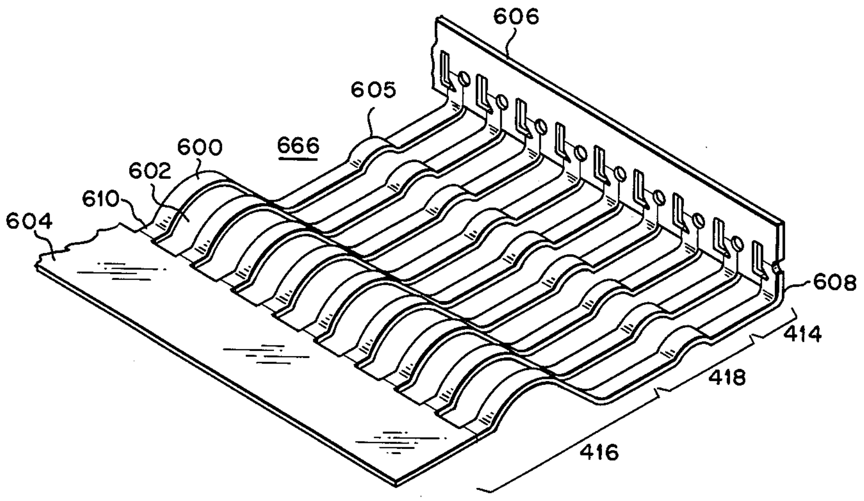
FIGURE 6 is a perspective view of a formed strip of conducting material utilized in making the terminals in the assembly of FIGURE 3.

Referring now to FIGURE 6, there is shown a perspective view of a punched and formed strip 666 of material, for example of beryllium-copper alloy mentioned previously, comprising a plurality of "teeth" 600 separated by punched out spaces 602. The strip of material is formed so that each of the teeth 600 has the shape of the terminals 406 etc., of FIGURES 3 and 4. The shape is provided because the strip 666 is actually a plurality of terminals joined together at their ends by breakaway portions 604 and 606 prior to their insertion into the frame 400. By forming the terminals in strips, as shown, they may be mass produced at a minimum cost. In addition, an entire strip of terminals may be inserted into the frame 400 such that N terminals 406 are located properly, spaced properly and rigidly fixed in position.

Figure 7:
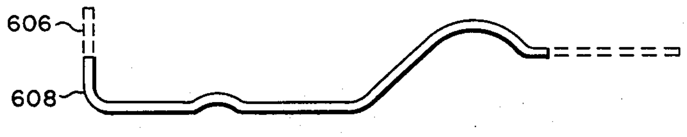
FIGURE 7 is a side view of the terminals shown in FIGURES 4 and 6.

As shown in FIGURES 4, 6 and 7 holding portion 418 comprises an arcuate projection 605 whereby there may be effected a more secure grip by the frame 400 material on the mounted terminal 406. The projection 605 need not consist of an arcuate shape, but could comprise a dimpled section, an upstanding spike-like portion, or any other gripping surface; in the alternative, the portion 418 could even be flat.

The interior terminal portion 412, as shown, comprises a flat strip with an end thereof bent to form a solder lug 608. The solder lug may have any convenient shape such that a solder joint, wrapped joint, or the like may be easily made therewith and also such that the punching and forming process is simple. For example, the solder lug 608 may be the end of portion 414 which has been bent at a right angle.

The exterior terminal portion 416 comprises an arcuate section which is bent away from the general line of the terminal to form a projection of considerable extent. This projection is necessary in order that the exterior portions 416 of the terminals 406 extend beyond the face of the frame 400 so that these terminals may contact one another to form the interconnections between core planes as shown in FIGURE 5. The arcuate exterior portion 416 may include a flat lip-like section 610 for convenience and to avoid a possibly dangerous sharp edged terminal; however, this lip need not be included and is shown herein as a preferred form. In addition, if the lip 610 is utilized, the formation of the strip of teeth 600 may be facilitated in that there is a greater strength imparted thereto by the breakaway strip 604.

Figure 8:
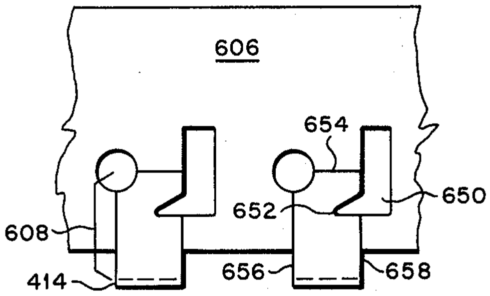
FIGURE 8 is an end view of an enlarged portion of FIGURE 7.

Referring to FIGURE 8, there is shown an enlarged view of the terminal end portion 414 and particularly the solder lug 608 with the attached breakaway strip portion 606 shown in FIGURE 6. The boot-shaped hole 650 is punched into the flat strip during the punching and forming operation. This hole 650 provides a notch 652 in the lug 608 which may be utilized for wrapping a conductor therearound. The configuration of hole 650 is merely illustrative and it should be understood that the hole may have any other shape, or may even be omitted. In order to facilitate the separation of lug 608 and breakaway strip 606, the entire strip is scored along lines 654, 656 and 658. Thus, by grasping strip 606 with a suitable means, for example pliers, and bending along the scored lines 654, 656 and 658, the strip 606 may be severed and discarded. The breakaway strip 604 may similarly be removed from exterior portions 410 by bending along the scored lines provided at their point of jointure. After a strip 666 such as shown in FIGURE 6 has been firmly imbedded in a frame 400, the breakaway strips 604 and 606 may be removed whereby an assembly having a plurality of equally spaced terminals 406 rigidly mounted in an insulating supporting board is provided.

In fabricating this assembly a preferred procedure is to construct a mold having the proper configuration such that the molded pieces will have the shape of frame 400. As mentioned previously, the frame 400 is made of an insulating material (e.g. Black Phenol). In order to utilize a mold the insulating material is melted or otherwise reduced to the fluid state and the fluid material may be poured to mold the frame 400 and the plane 402 as a unitary construction. Alternatively, the central plane 402 may be fabricated separately and inserted in the sides subsequent to the molding of the sides A, B, C and D. Furthermore, as another alternative the central plane 402 may merely comprise a ring or annular-shaped portion for supporting feedthrough lugs 424 whereby the mid-portion of the plane 402 may be omitted to provide a lightweight assembly.

A plurality of strips of teeth 600 are properly located around the sides of the mold prior to the pouring of the fluid material. Thus, when the insulating material which forms the frame 400 has solidified, the teeth 600 are firmly imbedded therein. That is, the holding section 418 with projection 605 is now encased by the hard frame 400 and the interior portion 414 and the exterior portion 416 extend therefrom as shown in FIGURES 3 and 4.

Figure 9:
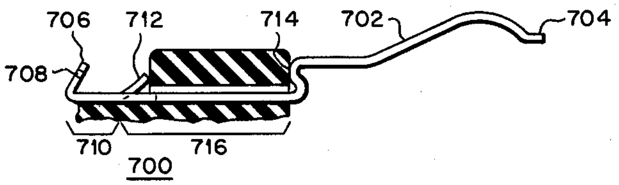
FIGURE 9 is a side view of a modified form of terminal embodying this invention.
Figure 10:
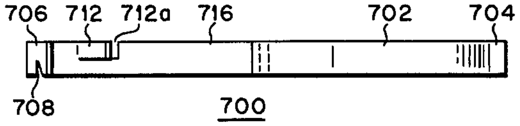
FIGURE 10 is a top view of the terminal of FIGURE 9.

An alternative procedure is contemplated in which the terminals 406 etc., may be inserted into the frame 400 after the molding thereof. That is, the frame 400 may be molded with holes extending through the sides A, B, C and D or the holes may be drilled after the molding, and individual terminals may be inserted therein. This alternative method would, of course, require a modification of the terminals 406, etc. FIGURES 9 and 10 show one type of terminal configuration contemplated. Arcuate portion 702 and lip 704 correspond to exterior portion 416 and lip 610 of the teeth shown in FIGURES 6 or 4. Similarly, solder lug 706 with a punched-out portion 708 corresponds to the lugs 608 previously described. The lug 706 is shown inclined at an acute angle relative to the interior portion 710, and it is bent up after passing through a hole in frame 400. The lug 706 may be resilient so as to spring up itself after passing through the hole. The upstanding portions 712 and 714 act as the shoulders which maintain the terminal 700 in place. That is, these portions are spaced apart by a distance equal to the thickness of the sides A, B, C and D of frame 400. Thus, after the terminal 700 has been passed through the hole in frame 400, the portion 712 springs up (or may be raised into an upright position) to bear against the inner surface of the frame 400, while the portion 714 bears against the outer face of the frame 400. Thus, the length of the interior portion 710 may be any convenient length to provide easy connection of conductors thereto; the length of the arcuate (exterior) portion 702 is determined by the interplane spacing and is arranged to be sufficient to permit contact with the similar portion of a terminal on an adjacent frame. The portions 712, 714 and 716 are determined by the thickness of the sides of the frame 400 and by the dimensions of the hole extending therethrough. That is, in order to assure a proper fit, portion 716 must be long enough for portion 712 to be enabled to stand, and portions 712 and 714 must be large enough so that they contact the inner and outer surfaces of the frame 400.

The portion 712 may assume any one of a number of desired configurations, and that configuration shown is meant to be merely illustrative as an easily attained shape. Thus, for example, portion 712 may, in actuality, be a section punched from the base 716 as shown by the gap **712*a* (FIGURE 10). Other configurations may include portions attached after forming the terminals 700**.

The feedthrough lugs 404 may be inserted into the central planar portion 402 during the molding process in a manner similar to that of the contact terminals, or they may be inserted subsequent thereto.

In the example cited in the introductory material there would be 60 core planes mounted in pairs on 30 frames 400. Each of these frames 400 would have only 100 interconnecting terminals 406, 408, etc., spaced around the periphery thereof. Therefore, there would be only 3000 external terminals (plus the control terminals 450–456 for the entire memory unit). In addition to materially reducing the number of interconnections, the necessity of solder connections is entirely eliminated. As pointed out supra, even the connection to the exterior circuitry is accomplished by the springy arcuate sections of terminals 406 etc. being placed against the arcuate contact sections of associated terminals on a dummy board assembly which is directly connected to the exterior circuitry. The connections between the extra or control terminals 450–456 for example is somewhat more complicated in that these terminals are connected individually; that is, they are connected in parallel rather than in series arrangement. However, a solder connection could be made to each of these terminals or an elongated terminal strip could be mounted adjacent to the stacked assemblies. This latter design is easily provided by locating a terminal strip near the rod 502 on which the frames 400 are mounted which terminal strip includes similar spring contacts thereby to connect the frame assemblies with control circuitry external to the memory.

Thus, there is provided a magnetic core memory unit which may be assembled with any desired number of planes. Moreover, there is provided a memory unit in which the external solder connections may be eliminated if desired whereby any of the assemblies or sub-units may be quickly and easily removed and/or replaced if such a need arises or which permits soldering of resilient contacts to assure permanent contact.

Having thus described the invention, what is claimed is:

1. In a circuit board assembly, a frame member, said frame member including a planar central portion and four side portions surrounding said central portion, said side portions having a greater thickness between opposite faces than said planar portion whereby said side portions extend beyond both surfaces of said central portion, a plurality of feedthrough lugs mounted in said central portion and adjacent each of said side portions, said lugs comprising an electrical conducting material, said lugs having a length slightly greater than the thickness of said central portion whereby the ends of said lugs protrude from each surface of said central portion but do not protrude beyond the dimensions of said side portions, said lugs being located at substantially equally spaced points around said central surface, and a plurality of connector terminals, each of said terminals being comprised of an electrically conducting material, some of said terminals being mounted in each of said four side portions such that the terminals are located adjacent both surfaces of said central portion and extend through and beyond the respective side portions in which they are mounted, said terminals including a contacting section projecting beyond the faces of said sides, said terminals being located in the spaces between said lugs.

2. The combination of claim 1 wherein the lugs and terminals on opposing sides of said frame member are mounted in offset alternating arrangement such that the lugs on one side are aligned with the terminals on the opposite side.

3. The combination of claim 1, wherein the terminals mounted in one side portion and mounted adjacent the two surfaces of the planar portion are aligned with the same lug.

4. In combination, a non-conducting circuit board comprising a square shaped assembly having four side portions and a central plane portion recessed below the faces of said side portions, and a plurality of terminals mounted in each of said side portions and adjacent each face of the central plane portion, said terminals comprising an electrically conducting material and being of unitary construction but having three distinguishable segments, a first one of said segments including a means which is imbedded within the side of said board for rigidly fixing and maintaining the location of the terminal, a second segment comprising a connection lug for having conductors connected thereto, said second section extending from one end of said first section and projecting from a side portion toward the center of said square shaped assembly, and a third segment extending from the other end of said first segment and comprising a contact section which extends above the faces of said side portions for contacting the contact sections of associated terminals in a glancing manner.

5. The combination of claim 4, wherein said first and third segments of the terminal each comprise an arcuate section, said third segment arcuate sections having such configuration that the glancing contact between associated terminals occurs substantially at the apex of the arcuate section.

6. The combination of claim 4, wherein the four sided square shaped assembly and said central plane portion comprise a unitary member molded of an insulating phenol.

7. The combination of claim 4, wherein said first segments comprise a planar strip which has an upstanding portion which may be imbedded in the side of said circuit board member.

8. A magnetic core memory assembly comprising a plurality of memory frames mounted adjacent one another; each of said memory frames comprising a substantially planar insulating frame member adapted to support an array of electrical components at opposite surfaces thereof, separate pluralities of spaced resilient contact terminals attached to the edges of said frame member, and arranged in first and second groups respectively adjacent opposite surfaces of said frame member, and a plurality of conductors individually connected to different ones of said contact terminals and arranged to provide a separate conductive path from each of said first group of contact terminals at one of said edges, each said conductive path adapted to be linked to said electrical components at said opposite surfaces and separately connected to one of said second group of contact terminals at said one edge, each of said terminals including resilient contact portions normally extending beyond one of said surfaces of said frame member, said terminals being similarly positioned on said frame members so that corresponding terminals on separate ones of said frames have their contact portions resiliently engaged when said plurality of frames are mounted in assembly.

9. A modular memory unit comprising an insulating support member, a plurality of electrically conductive contact terminals attached to said support member and mounted along and outside of peripheral sides thereof, said terminals being arranged in first and second pluralities respectively adjacent opposite first and second surfaces that are transverse to said sides, the terminals on opposite sides of each surface of said support member having a staggered configuration, said first and second plurality of terminals being similarly spaced along each of said sides and at similar locations along the same side of said member, a plurality of electrically conductive elements mounted in said support member near said sides and having their opposite ends extending to the opposite surfaces of said support member, said conductive elements being mounted between adjacent ones of said terminals near the same side of said support member so that each of said conductive elements is across from and aligned with a different first and second terminal on the opposite side of said member, and a plurality of first and second electrical conductors respectively arranged along said first and second surfaces, a different one of said first and a different one of said second conductors respectively connecting the opposite ends of each of said conductive elements to the ones of said first and second terminals that are aligned therewith.

10. A modular unit comprising an insulating frame, a plurality of resilient terminals attached thereto, said terminals including a contact portion extending beyond a side of said frame and extending beyond a surface of said frame such that said extended portion may be placed in contact with a similar contact portion of an associated terminal, electrical conductor means linking a pair of said terminals to provide a continuous electrical path between said terminals, said pair of linked terminals being on one side of said frame with one of said terminals on each surface of said frame such that the contact portion of said terminal extends beyond the surface with which the terminal is associated, and conductive means passing through said frame at the opposite side of said frame, said conductive means comprising at least a portion of said electrical conductor means.

11. A modular unit comprising an insulating frame, a plurality of resilient terminals attached thereto, said terminals including a contact portion extending beyond a side of said frame and extending beyond a surface of said frame such that said extended portion may be placed in contact with a similar contact portion of an associated terminal, electrical conductor means linking a pair of said terminals to provide a continuous electrical path between said terminals, said linked pair of terminals being mounted such that said terminals are on opposite sides and opposite surfaces of said frame, said contact portions thereby extending beyond different surfaces of said frame, and means passing through said frame at one side thereof and adjacent to one of said linked terminals, said last named means comprising at least a portion of said electrical conductor means.

12. A modular unit comprising a plurality of insulating frames, a plurality of resilient terminals attached to each of said frames, each of said terminals including a contact portion extending beyond a side of said frame and extending beyond a surface of said frame such that said extended portion may be placed in intimate but brushing contact with a similar extended contact portion of an associated terminal on a different one of said frames, and electrical conductor means linking a pair of said terminals on one frame to provide a continuous electrical path between said terminals whereby a continuous electrical path may be provided through the entire unit via said conductors and said terminals in intimate contact.

13. In combination, an annular frame member having a substantially square configuration, said annular frame member being fabricated of an insulating material and defining a broad surface, a plurality of identical terminal strips, said terminal strips being mounted in said insulating material so that the ends thereof extend beyond both sides of said annular frame member, a first one of said ends of each of said terminal strips comprising a lug for connecting conductor elements thereto, said lug being contained within said surface defined by said annular frame member, a second one of said ends of said terminal strips comprising an arcuate spring portion, each of said arcuate spring portions projecting beyond said surface defined by said annular frame member, said arcuate spring portions resiliently establishing tangential contact adjacent an intermediate section of said arcuate spring portions of associated terminals which project beyond said surface of different frames when stacked.

References Cited by the Examiner

UNITED STATES PATENTS

| | | | |
|---|---|---|---|
| 2,260,459 | 10/1941 | Kilar | 339—49 X |
| 2,283,040 | 5/1942 | Brinkman | 339—18 |
| 2,449,450 | 9/1948 | Carlson | 339—18 |
| 2,821,669 | 1/1958 | Christian. | |
| 2,823,372 | 2/1958 | Jones | 340—174 |
| 2,823,373 | 2/1958 | Consolvi | 340—174 |
| 2,877,440 | 3/1959 | Dorjee | 339—198 |
| 2,934,748 | 4/1960 | Steimen | 340—174 |
| 3,010,052 | 11/1961 | Heath et al. | 317—101 |
| 3,017,615 | 1/1962 | Smith et al. | 339—218 X |
| 3,026,494 | 3/1962 | Andersen et al. | 339—17 |

FOREIGN PATENTS

| | | |
|---|---|---|
| 563,579 | 9/1958 | Canada. |
| 583,969 | 1/1947 | Great Britain. |

ALBERT H. KAMPE, *Primary Examiner.*

JOSEPH D. SEERS, IRVIN L. SRAGOW, *Examiners.*